US006879990B1

(12) United States Patent
Boyer et al.

(10) Patent No.: US 6,879,990 B1
(45) Date of Patent: Apr. 12, 2005

(54) SYSTEM FOR IDENTIFYING POTENTIAL LICENSEES OF A SOURCE PATENT PORTFOLIO

(75) Inventors: Stephen K. Boyer, San Jose, CA (US); Alex Miller, Aptos, CA (US)

(73) Assignee: Institute for Scientific Information, Inc., Claymont, DE (US)

( * ) Notice: Subject to any disclaimer, the term of this patent is extended or adjusted under 35 U.S.C. 154(b) by 0 days.

(21) Appl. No.: 09/560,397

(22) Filed: Apr. 28, 2000

(51) Int. Cl.[7] .............................................. G06F 17/30
(52) U.S. Cl. ....................... 707/205; 707/102; 707/201; 705/1; 705/59; 705/306
(58) Field of Search .................... 707/1–10, 100–104.1, 707/200–205; 705/1, 59, 306

(56) References Cited

U.S. PATENT DOCUMENTS

| 5,418,946 A | 5/1995 | Mori ........................... 395/600 |
| 5,754,840 A | 5/1998 | Rivette et al. ............... 395/602 |
| 5,991,751 A | * 11/1999 | Rivette et al. .................. 707/1 |
| 5,999,907 A | 12/1999 | Donner ........................... 705/1 |
| 6,038,561 A | * 3/2000 | Snyder et al. ................. 707/10 |
| 6,175,824 B1 | 1/2001 | Breitzman et al. ............. 705/36 |
| 6,339,767 B1 | * 1/2002 | Rivette et al. .................. 707/1 |
| 2002/0029161 A1 | * 3/2002 | Brodersen et al. ............. 705/9 |

FOREIGN PATENT DOCUMENTS

WO    WO96/06402    2/1996    ........... G06F/17/60

OTHER PUBLICATIONS

Yamonaco, Lisa. Arnwine, Bonnie, Mountain View Seminar Development Team (Dialog Patent Seminar, from Knight Ridder Information Inc. Strategic Training and Development, 1995.*
Snow, "Caduceus: Creating tables of Data from Multiple Records: The REPORT Feature," Online v16 n5 pp:97–102, Sep. 1992.
Lambert, "The idiot's guide to patent resources on the Internet," Searcher v3 n5 p34, May 1995.
"Working smarter with Bizint," Information World Review, Nov. 1998.
Basch, "Dialog's RANK command: Building and mining the data mountain," Online v17 n4 pp:28–35, Jul. 1993.
MicroPatent intros RetroChem chemical research tool, Information Today v11 n6 p26, Jun. 1994.
"Information on Global Patents on the Internet Through Derwent's Patent Explorer," Information Today v 15 n5 p.2, May 1998.
U.S. PTO to Load Patents and Trademarks Full Text on Web, Sep. 1, 1998.

(Continued)

Primary Examiner—Jean M. Corrielus
Assistant Examiner—Isaac M. Woo
(74) Attorney, Agent, or Firm—McDonnell Boehnen Hulbert & Berghoff LLP

(57) ABSTRACT

A list of potential licensees of a patent portfolio can be generated from a source patent portfolio. To identify the licensees, the source patent portfolio comprising, for example, all the patents owned by a particular entity, can be created. Next, a list of a set of patents that are related to or associated with the patents in the source patent portfolio is generated. The unlicensed assignees of patents in this set of related patents are organized according to various criteria. For example, the assignees could be ranked based on the ratio of total patents held by an assignee to the number of patents in the set of associated patents held by that assignee. Such rankings can provide an indication of assignees that may be potential licensees of the patents in the source patent portfolio.

18 Claims, 9 Drawing Sheets

OTHER PUBLICATIONS

Snow, "Drug patent extension information online: Monitoring post–approval regulatory developments," Online, Jul. 1994.

Beiser, "Who Invented What?" Database v15 n3 p96, Jun. 1992.

Sandler, "Patent Process Portfolio of Patented Technologies Is a Key Unlocking Competitive Edge," Hartford Courant, Jan. 23, 1995.

Landendorf, "Protecting the BRAINCHILD // Austin ranks among the world's most active sites for patent awards—and shows no signs of slowing," Austin American Statesman, Jul. 25, 1994.

Malkiewicz, "IBM ranks first in U.S. patens awarded," Business Wire, Jan. 12, 1994.

Coy, "The global patent race picks up speed," Business Week, Aug. 9, 1993.

"Automated Patent Searching On Personal Computers," Oct. 26, 1989.

"Derwent's Patent Explorer Receives Editor's Choice Award From Database Magazine," Business Wire, Aug. 27, 1998.

"IBM: IBM receives most U.S. patents for sixth consecutive year," M2 Presswire, Jan. 12, 1999.

1993 Canadian Conference on Electrical and Computer Engineering, Edited by Vijay K. Bhargava, "Intelligent Subject Matter Classification and Retrieval," Vol. I, Vancouver, Sep. 14–17, 1993, pp. 15–18.

Aurigin (Original Ideas Are Gold), Aureka 7.0, "The Open Platform for Intellectual Property Asset Management," 1999, Aureka–Cite Module.

Michael Hehenberger, Ph.D., and Pascal Coupet, "Text Mining Applied to Patent Analysis," http://www–3.ibm.com/solutions/businessintelligence , 1998, pp. 1–13.

CHI Research, Inc. (Tracking the World's Technology), "Technology Analysis and Competitive Intelligence Services," http://www.chiresearch.com/techtrack.htm., Apr. 26, 2000, pp. 1–4.

Robert Buderi, Technology Review, "Comparnies Squeeze the Patent Pipeline," http://www.techreview.com/articles/ma00/buderi.htm., Apr. 26, 2000, pp. 1–7.

*Technology Review, "Industry: Computers,"* http://www.techreview.com/articles/ma00/scorecard1.php3? Apr. 26, 2000, pp. 1–2.

* cited by examiner

SYSTEM FOR IDENTIFYING POTENTIAL LICENSEES OF A SOURCE PATENT PORTFOLIO

CROSS-REFERENCE TO RELATED APPLICATIONS

This application is related to the following co-pending and commonly assigned applications, which application is incorporated by reference herein:

application Ser. No. 09/560,840 entitled "Method, Computer Program Product, and System For Determining Assignees Related by Classes Of a Classification System to a Source Patent Portfolio," filed concurrently herewith, by Steve Boyer, Thomas Griffin, and Alex Miller.

application Ser. No. 09,560,158 entitled "Method, Computer Program Product, and System For Determining Assignees Related by Common Cited References With a Source Patent Portfolio," filed concurrently herewith, by Steve Boyer, Thomas Griffin, and Alex Miller.

application Ser. No. 09/560,157 entitled "Method, Computer Program Product, and System For Determining Assignees Associated With a Source Patent Portfolio," filed concurrently herewith, by Steve Boyer, Thomas Griffin, and Alex Miller.

BACKGROUND OF THE INVENTION

1. Field of the Invention.

The present invention relates to systems and methods for making patent documents or portions thereof, such as abstracts, readily available through a computer interface. More specifically, the invention relates to ways of providing meaningful insights by processing a set of existing patents to determine other relevant information.

2. Present State of the Art.

Patent data, including full text and/or images of patents, portions of patents (e.g., patent abstracts, etc.), is available in computer databases and is well known in the art Currently, a number of companies provide patent information over the Internet, including the United States Patent and Trademark Office, The Intellectual Property Network, and others. While much of the current information is centered around patents issued by the United States, increasingly there is more information from all granting authorities worldwide.

These databases of patent information typically allow searching of the database to find patents of interest. Some searching can be done on the entire text of a patent while other searching is limited to certain portions of patent such as the claims or abstracts. Such searching allows patents of interest to be found by researchers, attorneys, patent examiners, etc. Additionally, in order to make finding relevant patents more convenient, some patent databases provide the ability to follow links to patents that cite a given patent or were cited by the examiner in the prosecution of a given patent.

In many instances, services are also available in association with the actual patent data. For example, it is common to be able to search for patents in a database and then "order" any particular patents of interest to be delivered to you by mail, fax, etc.

Patent databases are used by professional patent searchers doing prior art searches or validity searches for clients, patent examiners during the course of patent application examination, business people to understand areas of technology, and others. Companies who own patents can also conveniently track competitors' patent issuance activity using such patent databases.

Elements of textual analysis tools have been applied to patent databases in order to extract higher-level information or put more meaning into existing data. See, for example, *Text Mining Applied to Patent Analysis* by Hehenberger, et. al., IBM Corp. White Paper, 1998 There is a great need for such intelligent information and ever less expensive computer processing provides ample opportunity to provide such information.

What is needed are ways of calculating relevant intelligent information over what is currently offered by patent database providers and patent analysis products. This will allow new and important insights to be made by the users of such patent databases.

One needed insight is the ability to determine potential licensees for a particular patent portfolio. Currently, a company having a patent portfolio and desiring to find other companies that might want to license the portfolio rely upon general knowledge of the particular industry, searching for like competitors, etc. It would be beneficial to gain insight from analyzing patent data in order to find not so obvious companies that may be interested in a particular patent portfolio.

SUMMARY OF THE INVENTION

One aspect of the present invention will determine a ranked list of assignees that are likely candidates for licensing a source patent portfolio. The assignees are picked from a set of patents that is related or associated with the source patent portfolio.

When the present invention is invoked, a source patent portfolio is first created as a starting point. This source patent portfolio may be input by hand or otherwise derived. For example, an assignee may be indicated and all of the patents owned by that particular assignee may be derived and used as the source patent portfolio.

Next, a set of associated patents is determined that are associated or related with the source patent portfolio. There are many ways that patents may be associated with a source patent portfolio and in all cases, the goal is to find patents that are technically similar to patents in the source patent portfolio. For example, the set of associated patents could contain patents having "backwards" references (i.e., patents cited as a reference by a patent in the source patent portfolio), "forwards" references (i.e., patents that cite as a reference one of the patents in the source patent portfolio), or "shared" references (i.e., patents that cite as reference at least on of the references cited by a patent of the source patent portfolio).

Furthermore, the set of associated patents could be expanded upon by applying the same reference analysis to the current set of associated patents to add patents thereto that are relevant. This process can be done recursively to a specified number of levels or otherwise be stopped according to a specific criteria (e.g., certain number of patents, etc.).

A list of all the assignees in the set of associated patents is determined and those assignees that are already licensed or for some other reason can be readily eliminated are subtracted from the list.

The list of assignees (e.g., remaining assignees) is then organized based on one of a number of different ranking criteria that give insight and meaning to the relationship of the assignees of the associated patents with the source patent portfolio.

Some potential ranking criteria, include, but are not limited to, the following: assignees with the most patents that contain at least one reference, assignees that have the largest number of references, a ratio based on either number references or number patents to divided by the total number of patents owned by an assignee, any of the above with an extra weighting given to a patent with multiple references or extra weighting given to a type of reference, etc. Many different criteria can help organize the assignees in a manner that allows different views into how a particular assignee is bound to the technology of the source patent portfolio.

By carefully analyzing patent data, insights may be gained into which assignees may likely have need of a license to a particular set of patents or source patent portfolio. By looking at patent data globally, licensees that are not always apparent (e.g., smaller companies, companies with a pocket of technology in common with the source patent portfolio) may be readily identified.

BRIEF DESCRIPTION OF THE DRAWINGS

A more particular description of the invention briefly described above will be rendered by reference to specific embodiments thereof which are illustrated in the appended drawings. These drawings depict only one or more typical embodiments of the invention and are not therefore to be considered to be limiting of its scope. With respect to the following drawings, like reference numbers denotes the same element throughout the set of drawings.

FIG. 3A shows the steps for general patent searching, FIG. 3B shows the steps for accessing detailed information with respect to a certain patent, and FIG. 3C shows the steps for accessing a patent image.

DETAILED DESCRIPTION OF THE INVENTION

Figure 1:
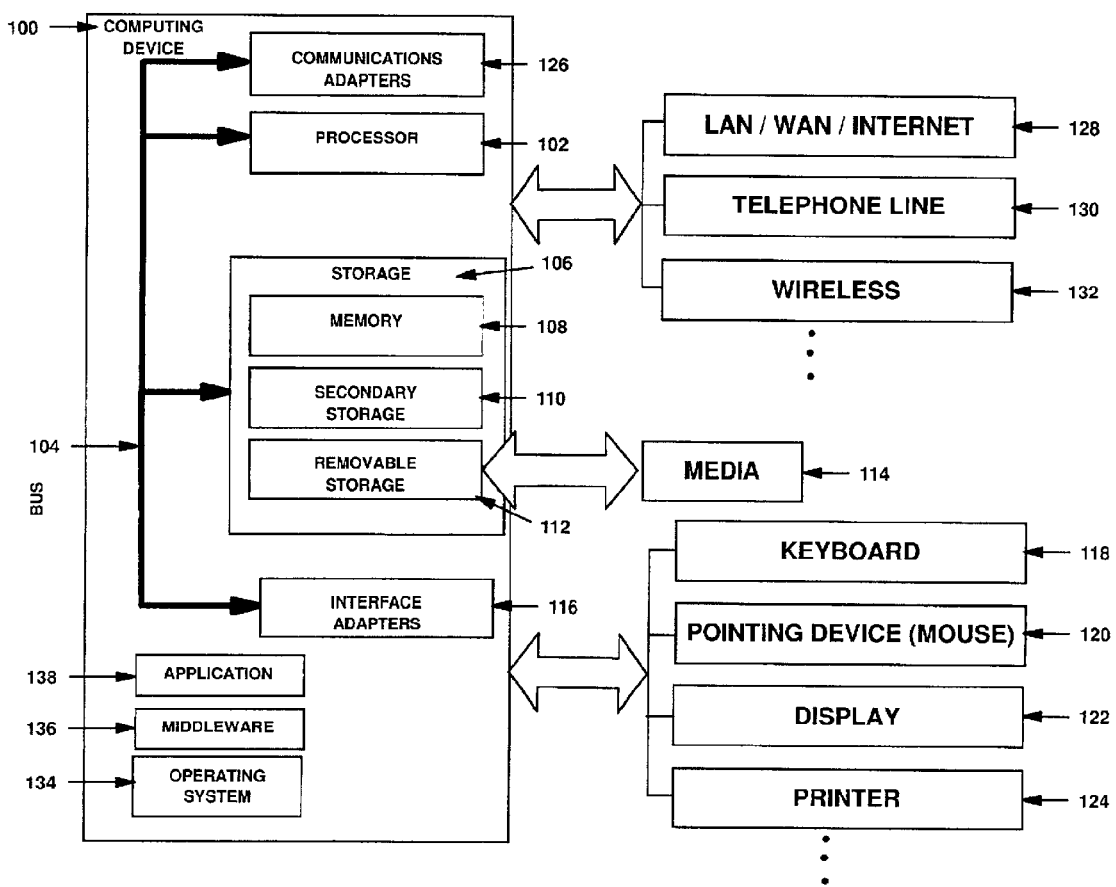
FIG. 1 is a block diagram of a computing device, such as a workstation, wherein the present invention may be practiced.

As used herein, the term "patent" refers to official technical grants from governments or other organizations. Note that other technical materials could also be organized and benefit by the present invention as long as they have the important characteristics associated with governmental patent grants (i.e., able to be organized into a classification system, cross-referencing, etc.). For example, many research journals have extensive bibliographies of articles that are technologically related that function in an analogous manner with respect to the techniques presented herein as "cited references" in patent documents.

As used herein, the term "patent portfolio" means a set of one or more patents. This set of patents are of particular interest for one reason or another. Preferably, though not necessarily, a patent portfolio would be the set of all patents belonging to a single assignee or inventor. Other types of portfolios could be used, however, such as the set of known patents in a related technology, etc.

As used herein, the term "assignee" refers to the entity, such as a corporation, that owns a particular patent usually by assignment. This term can also encompass inventors who do not assign their invention. Those skilled in the art will recognize that equivalent processing, results, and insight can be occur as disclosed herein with respect to inventor-owners as owners by actual assignment. For scholarly articles and other publications, an "author" could be viewed in the same manner as an inventor and an affiliated "organization," such as a company where the author works or university where the author attends school, could be viewed as an assignee.

As used here, the term "classification system" refers to an organized and defined method of grouping patents, usually, but not necessarily, along technology lines. A patent must fit into at least one class of a classification system and in some instances fit multiple classes. Examples of classification systems are the US patent classification system and the International Classification system for patents as well as the classification systems used by each country, organization, or entity that issues patents. Furthermore, technical articles in research publications can also be placed into classification systems.

As used herein, the term "references" refers to other patents, technical articles, and any other information that is associated with a patent. Usually, though not necessarily, these are found by an Examiner or submitted by an applicant during the course of patent prosecution and "cited" in the patent document. Generally speaking references that are not patent reference are simply referred to as "other references." Besides the official information associated with a particular patent, other information may be associated with the patent and can be used in the same form as any other reference.

Those skilled in the art will recognize that numerous classification systems may be devised that do not classify all the patents found in a country. For example, a specialized software technology classification system could include patent documents granted from multiple governmental authorities and even include relevant scholarly articles dealing solely with computer software.

Those skilled in the art will recognize that patents may be classified along other lines besides technology and that users may develop arbitrary user-defined classification systems. For example, patents may be classified into industry groups, product lines or lines of business, etc.

FIG. 1 is a block diagram of a computing device, such as a workstation, wherein the present invention may be practiced. The environment of FIG. 1 comprises a single representative computing device 100, such as a personal computer, workstation, laptop, hand-held computer, information appliance, etc., including related peripheral devices.

The computing device 100 includes a microprocessor 102 or equivalent processing capability and a bus 104 to connect and enable communication between the microprocessor 102 and the components of the computing device 100 in accordance with known techniques. Note that in some computing devices there may be multiple processors incorporated therein.

The microprocessor 102 communicates with storage 106 via the bus 104. Memory 108, such as Random Access Memory (RAM), Read Only Memory (ROM), flash memory, etc. is directly accessible while secondary storage device 110, such as a hard disk, and removable storage device 112, such as a floppy diskette drive, CD ROM drive, tape storage, etc. is accessible with additional interface hardware and software as is known and customary in the art. The removable storage device 112 will have associated therewith an appropriate type of removable media 114, such as a diskette, CD, tape reel or cartridge, solid state storage, etc. that will hold computer useable data and is a form of computer useable medium. Note that a computing device 10 may have multiple memories (e.g., RAM and ROM), secondary storage devices, and removable storage devices (e.g., floppy drive and CD ROM drive).

The computing device 100 typically includes a user interface adapter 116 that connects the microprocessor 102 via the bus 104 to one or more interface devices, such as a keyboard 118, a mouse or other pointing device 120, a display 122 (such as a CRT monitor, LCD screen, etc.), a printer 124, or any other user interface device, such as a touch sensitive screen, digitized entry pad, etc. Note that the computing device 100 may use multiple user interface adapters in order to make the necessary connections with the user interface devices.

The computing device 100 may also communicate with other computing devices, computers, workstations, etc. or networks thereof through a communications adapter 126, such as a telephone, cable, or wireless modem, ISDN Adapter, DSL adapter, Local Area Network (LAN) adapter, or other communications channel. This gives the computing device direct access to networks 128 (LANs, Wide Area Networks (WANs), the Internet, etc.), telephone lines 130 that may be used to access other networks or computers, wireless networks 132, such cellular telephone networks, and other communication mechanisms. Note that the computing device 100 may use multiple communication adapters for making the necessary communication connections (e.g., a telephone modem card and a Cellular Digital Packet Data (CDPD). The computing device 100 may be associated with other computing devices in a LAN or WAN, or the computing device can be a client or server in a client/server arrangement with another computer, etc. All these configurations, as well as the appropriate communications hardware and software, are known in the art.

The computing device 100 provides the facility for running software, such as Operating System software 134, Middleware software 136, and Application software 138. Note that such software executes tasks and may communicate with various software components on this and other computing devices.

As will be understood by one of ordinary skill in the art, computer programs such as that described herein (including Operating System software 134, Middleware software 136, and/or Application software 138) are typically distributed as part of a computer program product that has a computer useable media or medium containing or storing the program code. Therefore, "media", "medium", "computer useable medium", or "computer useable media", as used herein, may include a computer memory (RAM and/or ROM), a diskette, a tape, a compact disc, an integrated circuit, a programmable logic array (PLA), a remote transmission over a communications circuit, a remote transmission over a wireless network such as a cellular network, or any other medium useable by computers with or without proper adapter interfaces. Note that examples of a computer useable medium include but are not limited to palpable physical media, such as a CD Rom, diskette, hard drive and the like, as well as other non-palpable physical media, such as a carrier signal, whether over wires or wireless, when the program is distributed electronically. Note also that "servlets" or "applets" according to JAVA technology available from Sun Microsystems out of Mountain View, Calif., would be considered computer program products.

Although the enabling instructions might be "written on" on a diskette or tape, "stored in" an integrated circuit or PLA, "carried over" a communications circuit or wireless network, it will be appreciated, that for purposes of the present invention described herein, the computer useable medium will be referred to as "bearing" the instructions, or the instructions (or software) will be referred to as being "on" the medium. Thus, software or instructions "embodied on" a medium is intended to encompass the above and all equivalent ways in which the instructions or software can be associated with a computer useable medium.

For simplicity, the term "computer program product" is used to refer to a computer useable medium, as defined above, which bears or has embodied thereon any form of software or instructions to enable a computer system (or multiple cooperating systems) to operate according to the above-identified invention.

The term "data structure" refers to a particular organization of meaningful data values that can be used in a predetermined fashion. For example, a network packet has a variety of different data elements that are used and accessed by communications networks and computer nodes for transporting the packet between different computer systems. The packet, as described above, is a data structure and has a tangible embodiment in a computer useable medium when stored in a file, when loaded into system memory, when transported across a communications network, etc. in the same fashion as a computer program product.

It will be likewise appreciated that the computer hardware upon which the invention is effected contains one or more processors, operating together, substantially independently, or distributed over a network, and further includes memory for storing the instructions and calculations necessary to perform the invention.

Those skilled in the art will recognize that a system according to the present invention may be created in a variety of different ways known in the art. For example, a general purpose computing device as described in FIG. 1 may be configured with appropriate software so that the computing device functions as described hereafter. Furthermore, discrete electronic components may be used to create a system that implements all or part of the functional. Finally, note that combinations of multiple computing devices running appropriate software or discrete electrical components can be used in like fashion. Essentially, the hardware is configured (whether by software, custom designed, etc.) to perform the functional elements making up the present invention.

Figure 2:
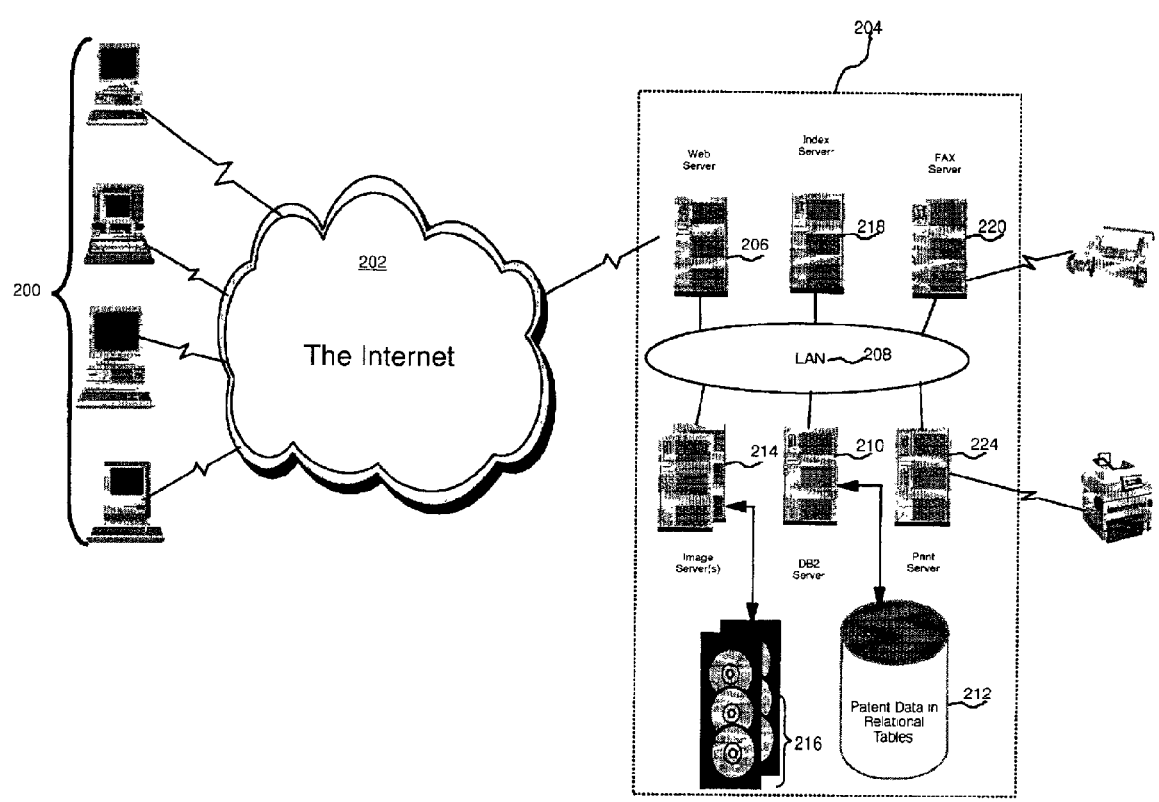
FIG. 2 is logical diagram of an exemplary environment and system of a patent database accessible over the Internet where the present invention can be used and implemented.

Referring to FIG. 2 a logical diagram of an exemplary environment and system of a patent database accessible over the Internet is shown. Client systems 200 are connected to the Internet 202 where they may access the patent database service 204 (represented by the enclosed systems). Note that client systems are typically any computing device 100 that have access to the Internet and will include an ever growing number of devices from Internet "appliances" to cell phones to conventional PCs running web browsing software.

The patent database service 204 interacts with clients 200 by way of a web server 206 that receives requests and serves up pages or documents in HTML format. These pages can be read by common browser software running on the clients 200 and form the user interface with the patent database service 204. For example, a page exist that allow a user to enter a query for patent data while another page will contain a "hit" list of patents that meet the criteria specified in the query. Furthermore, pages can be used to have hardcopies of selected patents faxed to a recipient or printed and mailed to a recipient or to access any other service supported.

The web server is connected to a Local Area Network (LAN) 208 that allows communication with other systems that make up the patent data service 204. Actual patent data is accessible as textual data through a database server 210 with textual data stored in relational tables in the patent data base 212, as image data through image server 214 with patent image data stored on CD ROM towers 216, and as a searchable index through the index server 218 that contains an index of the relational tables in the patent data base 212. The DB2 relational database server from IBM corporation is one preferred relational database server and others exist in the marketplace.

The patent data is loaded into the patent database 212 and organized in tables according to the various parts of the patent documents. Raw patent data found in a flat file is parsed into defined fields appropriate for servicing queries on the data. Using US patent data as an example, the database may be set up with a main"table" for "Patents" with each entry having a patent number (patn), the main United States class of the patent (US_class), etc. Other tables could be used to show the linkage between patents or between patents and other technical references. Note that those skilled in the art will recognize that the data can be and in many instances should be organized in different tables in order to achieve efficient operation in terms of storage and data base performance. For purposes of example teaching, a logical organization of patent data is presented below:

Patents(patn, assignee_name, US_class, licensee_flag, . . . ) The "Patents" table contains the bulk of the patent information. Besides the patent number (patn), the assignee (assignee_name), the main United States class of the patent (US_class), and an indication if the assignee is licensed (licensee_flag), the table may contain entries for the various parts of the issues patent such as abstract, claims, etc. Additional information about the patent such as whether it is or has been involved in litigation, whether the maintenance fees are current, etc. can also be placed in this table. Only those columns that are relevant to explain the present embodiment are shown. When an assignee is licensed to a particular patent, the licensee_flag will be marked to true or 'Y'. Note that those skilled in the art may elaborate upon this basic structure to include sub classes or multiple classification systems and other apparent modifications.

Pref(patn, pat_reference . . . ) The "Patent Reference" (Pref) table allows for making the connections between different patents. Each entry is a patent number (patn) and a patent number of a reference cited for that patent (pat_reference). There is a many-to-many relationship between patn and pat_reference since a given patent may have many patent references cited thereto and the same patent may be cited in many different patents.

Oref(patn, other_reference, . . . ) The "Other Reference" (Oref) table allows for making connections between patents and other technical publications. Each entry is a patent number (patn) and a reference cited for that patent (other_reference). There is a many-to-many relationship between patn and other_reference since a given patent may have many technical publication references cited thereto and the same technical publication may be cited in many different patents.

The preceding general tables are presented in logical format and it is understood that an actual implementation may break the tablea up in such a manner as will facilitate management of such a large amount of data as is required for collections of patent data.

Note also that a patent data service 204 may take information from multiple sources to build the patent database 212. For example, the US patent office periodically releases current status on the payment of maintenance fees required to keep a patent in force. This information may be combined with the information issued patents to know whether a particular patent is still enforceable or not.

Another example would be the utilization of assignee changes published periodically due to mergers, acquisitions, etc. The power of organizing the patent information in the form of relational tables allows easy correlation of this changed information received after the fact to the issued patent data.

Those skilled in the art will realize that a patent data service could also bring in relevant information beyond that provided by an issuing authority. For example, information regarding the assignee could be placed in the database or otherwise made available (i.e., links to other databases or web sites).

Once the date has been appropriately parsed into a database (preferably an SQL relational database, such as IBM's dB/2) users can then perform (SQL) queries on the data to search for desired data. In a relational environment, the powerful capabilities of relational operations can be used advantageously to get information that would be very difficult to obtain if the data was organized in other formats, such as stored as flat files.

Other elements that are part of the patent data service are image servers 214 that are used to access images of the actual patents stored on a number of CD ROM towers 216, an index server 218 that provides an easily searchable index of all the patent data in the patent database 212, a fax server 220 that is used to fax an image of a patent or other information to a recipient fax machine 222, and a print server 224 that will print patent documents or other data onto a printer 226. Together, the constituent elements of the patent data service 204 provide base patent data services, such as access to full text searching on patent data or patent document delivery services, and more advanced services.

Those skilled in the art will recognize that many variations on the patent data service 204 as shown can be made without changing the basic purposes of the service. For example, not all of the different servers are needed depending on the level of service provided. For example, if fax delivery is not supported, the fax server 220 is not needed. Additionally, a single physical machine may support more than one of the servers illustrated.

Figure 3A:
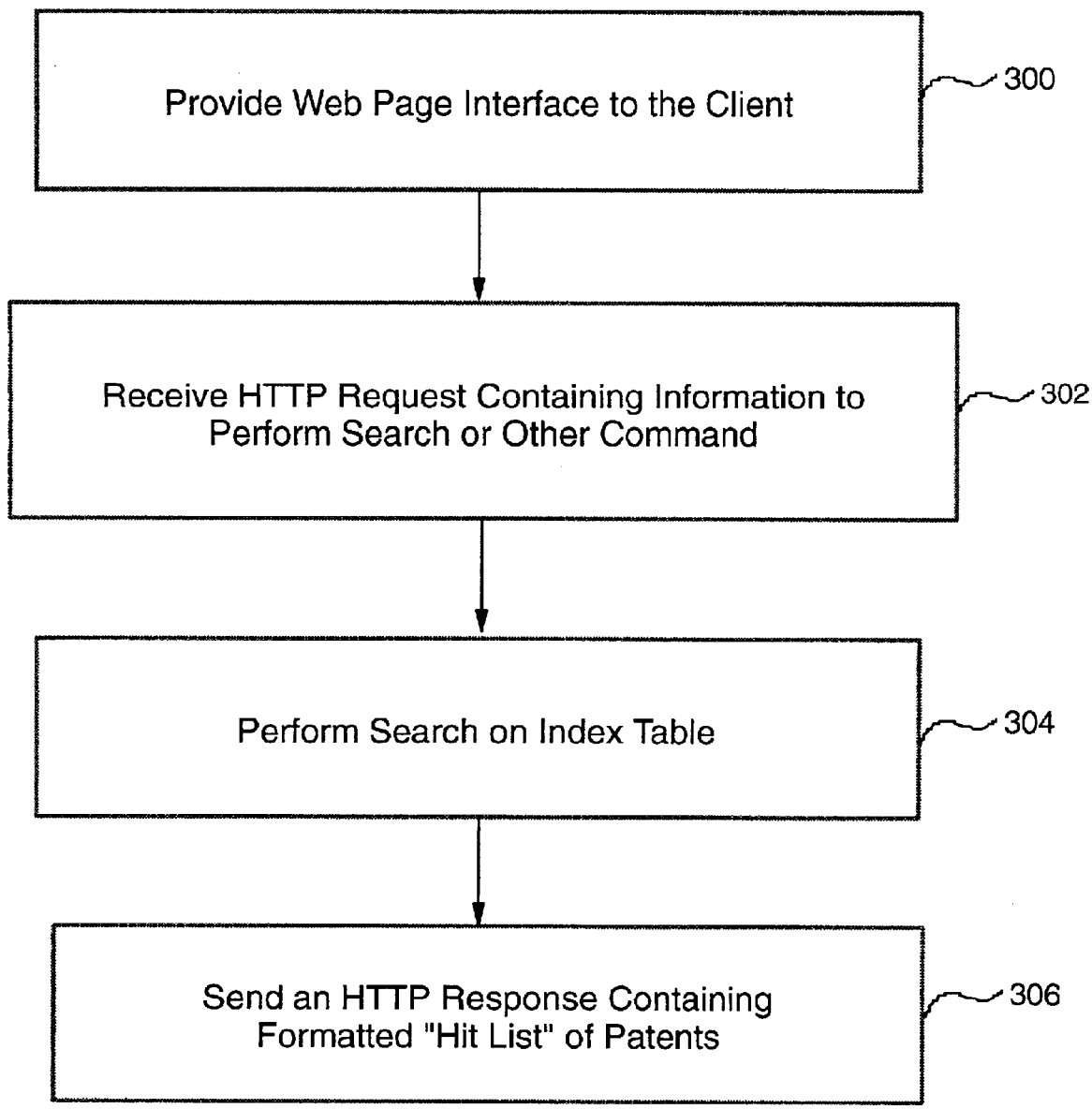
FIGS. 3A–3C are flow charts showing the operation of the system shown in FIG. 2 above.
Figure 3B:
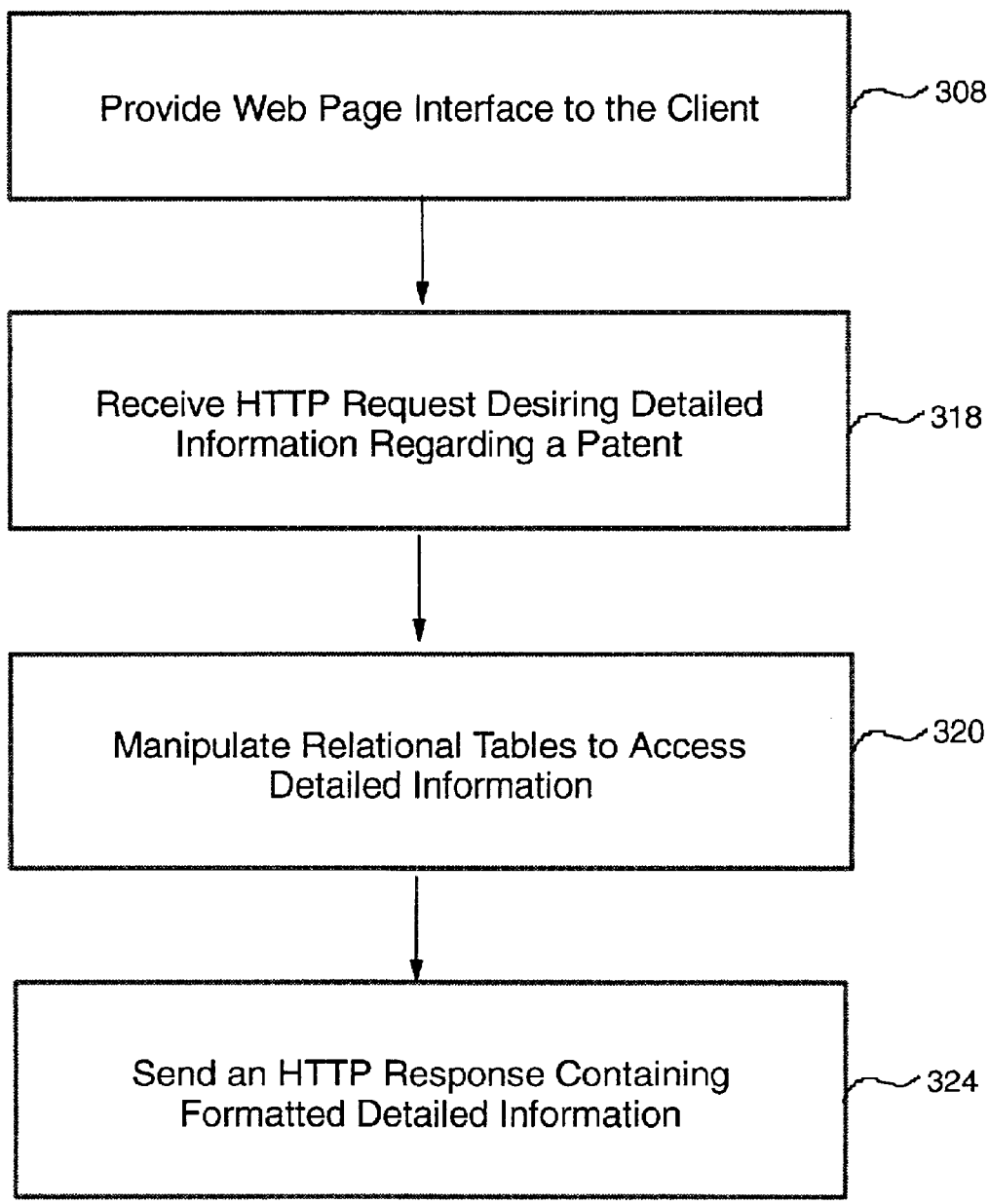
Figure 3C:
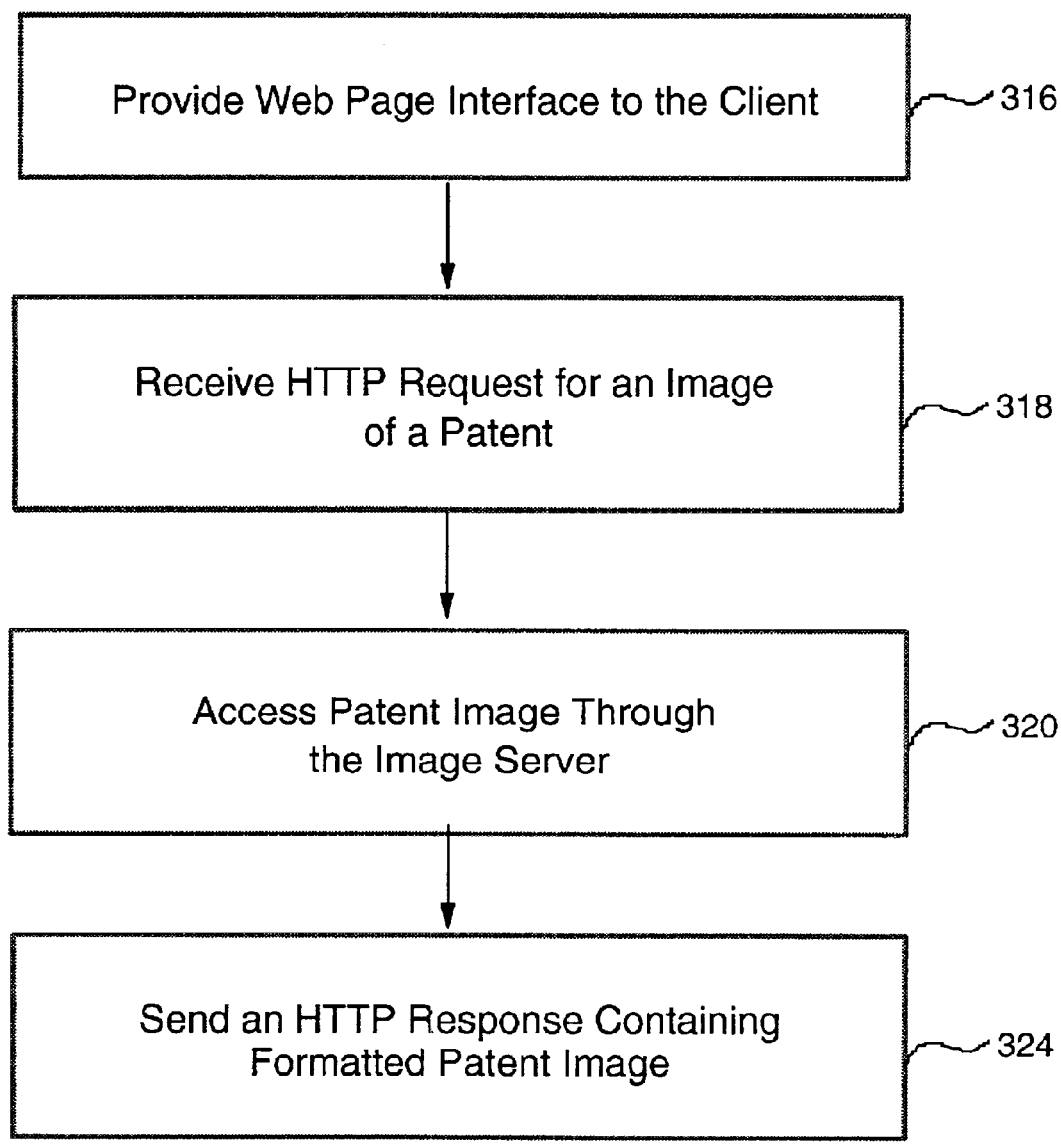

Referring now to FIGS. 3A–3C, flow charts showing operation of the patent data service 204 are presented. FIG.

3A is an example operation of processing a query. Though this example deals with query processing that returns a "hit list" of patent numbers and titles, it is instructive to show the operation of the system. Initially, one of the clients 200 will contact the web server 206 that will return a web page interface to the client at step 300. This web page will have an area that allows the user to indicate a query to the patent database. Once the user selects the query terms he will depress a search button or otherwise cause the query information to be transmitted to web server 206.

At step 302, the HTTP request containing the query information is received at the web server 206. The web server 206 will process the information and determine that a query is desired and what search terms need to be used and will make access to the index server 218 over the LAN 208. A Common Gateway Interface (CGI) script is typically used to translate the search terms found in the HTML document to proper SQL statements that can be processed by a database search engine. Note also, that XML with stylesheets may also be implemented to provide the HTML compatible pages to browsers and the like and allow further flexibility to the patent data service.

The index server 218 has a search engine and a patent index to all the patent data found in relational patent data base 212. The index server 218 will receive the SQL query and execute the search into the patent index at step 304; returning the results to the web server 206. These results come back in the form of a "hit list" indicating a patent number, issue date, and title. Finally, the web server 206 manipulates the hit list data into the proper format and serves up the search results in an HTML document that is returned in the HTTP response to the client. The user can then view the search results using the HTML capable browsing software executing on the client.

Referring now to FIG. 3B, a flow chart showing the steps taken to access more detailed patent information is presented. Again, the client is provided some form of user interface in an HTML page by the web server 206 at step 308. This may be part of the hit list page discussed previously (e.g., clicking on the patent number or title might trigger a request for more detailed information) or in an unrelated page.

At step 310, the HTTP request containing the request for more detailed information regarding a specific patent is received at the web server 206. The web server 206 will process the request and will make access to the data base server 216 over the LAN 208 to retrieve the detailed information. Again, a CGI script is used to create the proper SQL statement(s) that direct the search engine.

This detailed information can be anything according to the system design up to including the entire text of the patent along with other relevant information. One example set of "detailed" information is the first page data of a US patent along with the abstract and initial claim.

The data base server 210 will execute the search into the relational patent data base 212 at step 312 and return the results to the web server 206. Next, the web server 206 arranges the detailed information into the proper format and serves up the search results in an HTML document that is returned in the HTTP response to the client. This formatting may include links that will cause the patent data service 204 to provide additional detailed information (e.g., the short summary or other section of the patent that wasn't provided previously), links to request images of the actual patent document, additional services, etc. The user can then view the detailed information using the HTML capable browsing software executing on the client.

Referring now to FIG. 3C, a flow chart showing the steps taken to download an image of an actual patent document is presented. Again, the client is provided some form of user interface in an HTML page by the web server 206 at step 316. This may be part of the hit list page discussed previously (e.g., clicking on button might trigger a request for the patent image) or in an unrelated page that lets the user designate which patent(s) are desired as an image of the original patent document.

At step 318, the HTTP request containing the request for the image regarding a specific patent is received at the web server 206. The web server 206 will process the request and will make access to one or more image servers 214 over the LAN 208 to retrieve the patent image from the CD ROM towers 216 storing a library of such images. The user can request the patent image to be in any one of commonly available formats such as TIFF, PDF, etc.

The image server 214 will access the image from the CD ROM towers 216 at step 320 and return the results in the proper image format to the web server 206. Finally, the web server 206 causes the patent image to be downloaded to the client where it can be viewed, saved, printed, or otherwise manipulated by the user at step 324.

Figure 4:
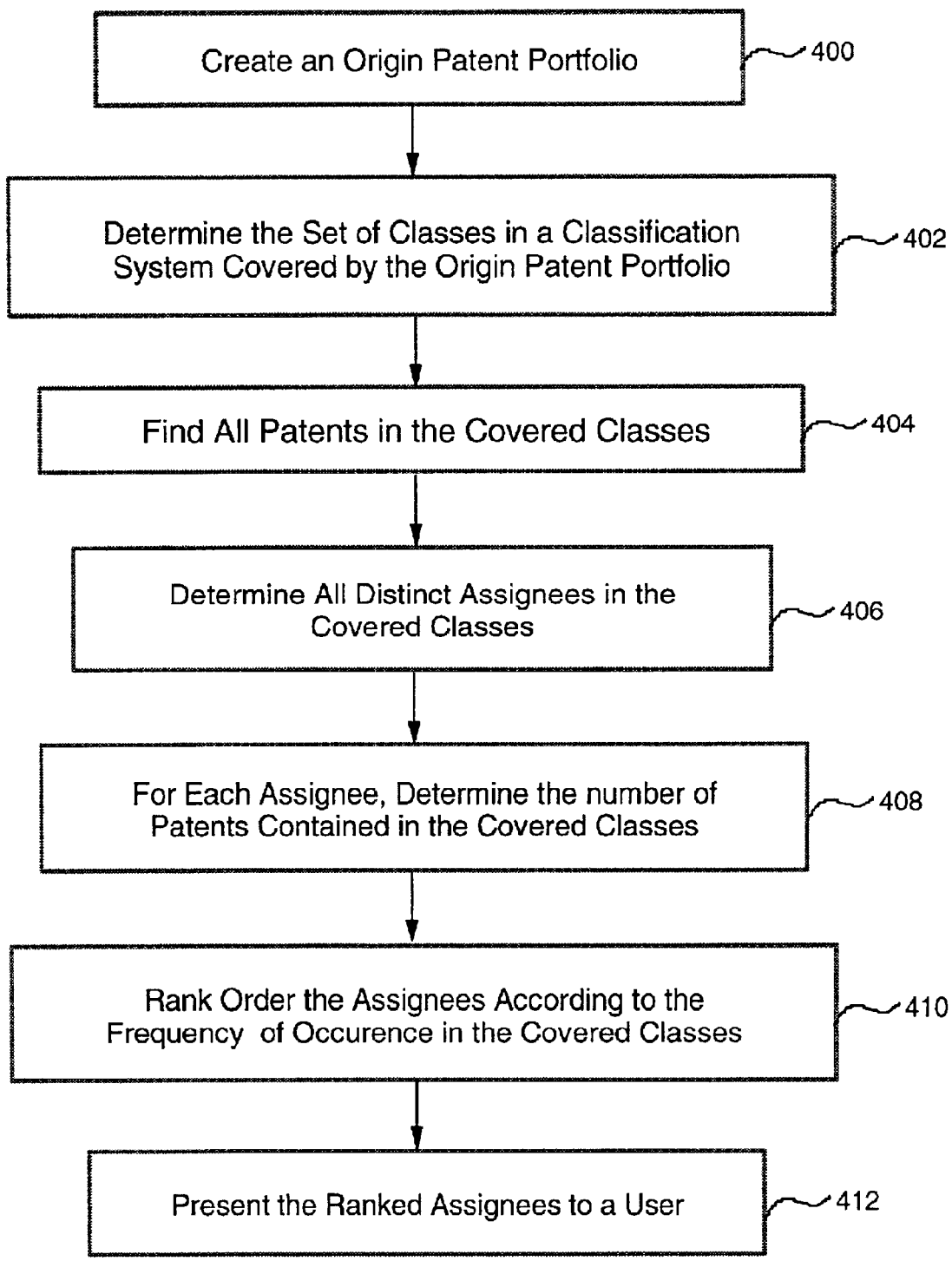
FIG. 4 is a flow chart showing processing steps taken to create and present a list of assignees related to a source patent portfolio by way of the classes covered by the source patent portfolio and organized according to a ranking criteria.

Referring now to FIG. 4, a flow chart showing the processing steps taken to create a list of assignees that are related to a source patent portfolio by having classes of a classification system in common is presented. The results of such an analysis can give insight into what other assignees are heavily involved in the same technology areas as that covered by the source patent portfolio.

Initially, at step 400 a source patent portfolio is created or identified. Those skilled in the art will recognize that there are many ways that could be employed to determine a set of patents that make up a source patent portfolio. For example, A user may select the individual patents of interest that make up the source patent portfolio though this could be a tedious task. Alternatively, the source patent portfolio may be based on a search of the patent database 212.

One useful way is to base the source patent portfolio on some or all of the patents held by a particular assignee. The desired assignee can be received by the web server 206 and all of the patents can be determined for that assignee and used as a source patent portfolio. Depending on whether we use the assignee code used by the USPTO or an assignee name, the following SQL statement against the table definitions presented previously would return the desired patent numbers to make an assignee source patent portfolio:
SELECT patn
FROM Patents
WHERE assignee_name=<name>

Assignees can be organized according to name and/or preferably by the USPTO normalized assignee number. Using the assignee number is generally a more reliable way of getting all of the patents for a particular assignee as variations in assignee name or typographical errors will be recognized as different assignees. Below is an example of an SQL statement using the assignee code that can be derived from an assignee name.
SELECT patn
FROM Patents
WHERE assignee_code=<code>

Once a source patent portfolio has been created, the set of classes in a classification system covered by the source patent portfolio is determined in step 402. The source patent portfolio will be referred to as PORTFOLIO and is composed of a set of patent numbers.

Once the desired source patent portfolio PORTFOLIO is created, the set of classes, COVERED_CLASSES, that are covered by the source patent portfolio is determined at step 402. Again using the example of US patent data organized into relational tables indicated previously, one way to achieve this is shown with the following SQL statement will would return the appropriate set of US classes:

SELECT DISTINCT US_class
FROM Patents
WHERE patn IN SELECT patn FROM PORTFOLIO

Now, a set of patents representing all the patents in the covered classes occurs at step 404. This operates as an intermediary set for further processing. One way to achieve this using patent data organized in relational tables as presented previously requires issuing the following SQL statement to create a set of patents, COVERED_PATENTS:

SELECT DISTINCT patn
FROM Patents
WHERE US_class IN SELECT US_class FROM COVERED_CLASSES From this intermediate set of patents, all the distinct assignees are determined at step 406. Furthermore, each distinct assignee will eventually be organized according to a ranking criteria that will help provide meaning into the relationship of the assignee with respect to the covered classes.

As used herein, the term "ranking criteria" refers to many different forms of organizing the assignees. While some examples follow, those skilled in the art will clearly recognize ways of ranking or otherwise organizing a group of assignees so that the most relevant assignees for a particular purpose can be easily identified.

For example, one simple criteria is that of the assignees with the most patents in the covered classes should be ranked highest will indicate which assignees (i.e., companies or competitors) are most present in the classes of the source patent portfolio. At step 408 the number of patents for each assignee is determined and the assignees are ranked according to the number of patents in the covered classes in step 410. An example SQL statement that can achieve this result using the tables of US patent data shown previously and the intermediate results explained above:

SELECT COUNT(patn) AS pcount, assignee_name
FROM Patents
WHERE patn IN SELECT patn FROM COVERED_PATENTS
GROUP BY assignee_name
GROUP BY pcount Such an SQL statement would return results in the example format of Table 1 below:

TABLE 1

| assignee_name | pcount |
|---|---|
| XYZ | 29 |
| LMN | 21 |
| ABC | 13 |
| PQR | 13 |
| . | . |
| . | . |
| . | . |

Another way of ranking the distinct assignees determined in step 406 is to provide a weighted view of the patents in the covered classes so that an indication of a given assignee's (i.e., company's, competitor's) total portfolio is in the covered classes. In other words, those assignees who have a large percentage of their total patents in the covered classes will tend to be ranked higher even if they have relatively fewer patents than other assignees who have more patents numerically in the covered classes. This tends to focus more on an assignee's focus along a particular technology and may be more relevant.

This can be easily done by finding the number of total patents for each assignee (in all classes) and dividing this number into the number found in the covered classes. This gives a ratio of the total patents to the patents in the covered classes for each assignee.

As an example, the total number of patents for each assignee can be determined by the following SQL statement:

SELECT COUNT(patn) AS pcount, assignee_name
FROM Patents
WHEREIN assignee_name IN
  (SELECT assignee_name
  From Patents
  WHERE patn IN
    (SELECT patn
    FROM COVERED_PATENTS))
GROUP BY assignee_name
ORDER BY pcount Given this information, the calculations can readily be made to determine the ratio above indicating the amount each assignee is invested into the covered classes and the results tabulated into Table 2 below:

TABLE 2

| assignee_name | Ratio |
|---|---|
| ABC | 1.0 |
| LMN | .88 |
| XYZ | .10 |
| PQR | .10 |
| . | . |
| . | . |
| . | . |

Reviewing the results of Table 2 in comparison with Table 1, we note that while assignee ABC had significantly fewer patents than assignee XYZ, all of those patent were in the covered classes and would suggest that the entire company is centered around the technology of the covered classes. XYZ, on the other hand, while well represented and covered by patents in the covered classes does not have a significant portion of its overall technology portfolio (as represented by issued patents) in the covered classes.

Finally, at step 412, the results of the previous steps processing' that created the ranked list of assignees related by the classes covered by the source patent portfolio is presented to a user. In the environment of the patent data service 204, this is done by returning the results of the SQL statements done on the relational patent data base 212 by the data base server 210 to the web server 206. The results are formatted for the client by the web server 206 and sent to a client browser in response to an initial request.

Figure 5:
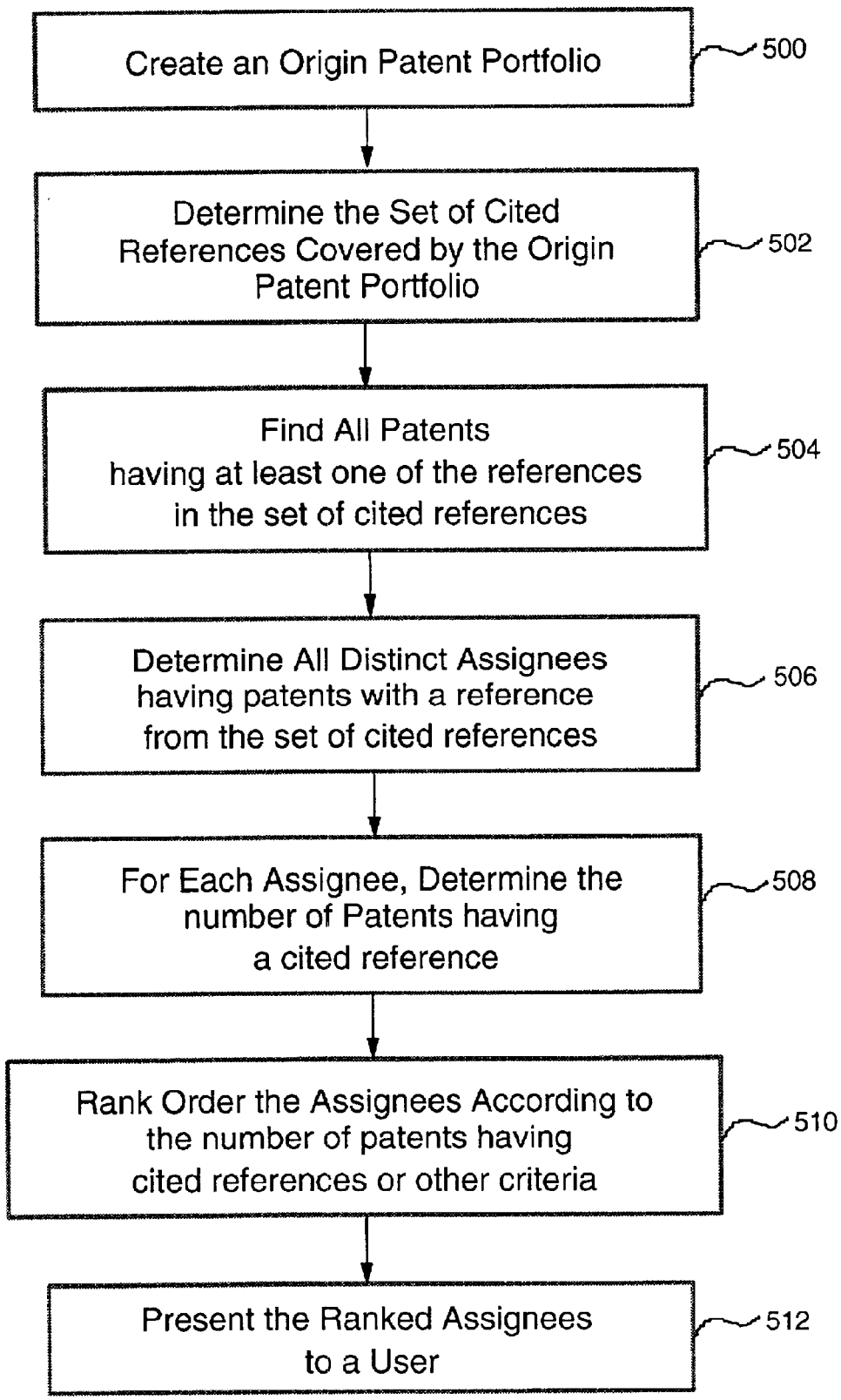
FIG. 5 is a flow chart showing processing steps taken to create and present a list of assignees associated to a source patent portfolio related by way of the references cited in the patents of the source patent portfolio and organized according to a ranking criteria

Referring now to FIG. 5, a flow chart showing the processing steps taken to create a list of assignees that are related to a source patent portfolio by having cited references in common is presented. The results of such an analysis can give insight into what other assignees are heavily involved in the same technology areas as that covered by the source patent portfolio.

Initially, at step 500 a source patent portfolio is created or identified. The various ways a patent portfolio can be created was explained in more detail above. Those skilled in the art will recognize that there are many ways that could be employed to determine a set of patents that make up a source patent portfolio.

Once a source patent portfolio has been created, the set of cited references covered by the source patent portfolio is determined in step 502. The source patent portfolio will be referred to as PORTFOLIO and is composed of a set of patent numbers.

Once the desired source patent portfolio PORTFOLIO is created, the set of cited patent references, COVERED_PATENT_REFERENCES, and the set of other references, COVERED_OTHER_REFERENCED, contained in the source patent portfolio is determined at step 502. Again using the US patent data organized into relational tables indicated previously, we can use all of the patents contained in the bibliographic information for each of the patents in PORTFOLIO as an example of a set of cited to references. Note that those skilled in the art could include the other non-patent references in the bibliographic information or data outside of the patent itself but afterwards related in some way. For the cited patent data example, this is shown with the following SQL statement(s) which will return the set of cited patent references, COVERED_PATENT_REFERENCES, and a set of other references, COVERED_OTHER_REFERENCES, that together include references to other US patents (pat_references) and references to other material (other_references), such as academic publications, professional journals, etc. The SQL statement below is used for COVERED_PATENT_REFERENCES:
SELECT DISTINCT pat_reference
FROM Pref
WHERE patn IN SELECT patn FROM PORTFOLIO To determine COVERED_OTHER_REFERENCES, a similar SQL statement is used:
SELECT DISTINCT other_reference
FROM Oref
WHERE patn IN SELECT patn FROM PORTFOLIO Now, a set of patents representing all the patents that have cited therein at least one of the references from the cited references lists, COVERED_PATENT_REFERENCES and COVERED_OTHER_REFERENCES, is computed at step 504. This operates as an intermediary set for further processing and is known as SHARED_REFERENCE_PATENTS. One way this can be done using patent data organized in relational tables as presented previously requires joining the following SQL statements to create a set of patents, SHARED_REFERENCE_PATENTS:
SELECT DISTINCT patn
FROM Pref
WHERE pat_reference IN SELECT pat_reference FROM
    COVERED_PATENT_REFERENCES
SELECT DISTINCT patn
FROM Oref
WHERE other_reference IN SELECT other_reference FROM
    COVERED_OTHER_REFERENCES From this intermediate set of patents, all the distinct assignees are determined at step 506. Furthermore, each distinct assignee will eventually be organized according to a ranking criteria that will help provide meaning into the relationship of the assignee with respect to the source patent portfolio.

For example, one simple criteria is that of ranking the assignees with the most patents having at least one common cited references with one of the patents in the source patent portfolio (i.e., the most patents in SHARED_REFERENCE_PATENTS). The highest ranked will indicate which assignees (i.e., companies or competitors) are most linked by common references to the source patent portfolio. It should follow that the assignees are in very much the same technology area at the source patent portfolio since the patent examiners are citing the same relevant art, the inventors have knowledge of the same references that they submit, searches performed by counsel and submitted are uncovering the same technology, etc.

Since some patents by a particular assignee may contain more than one of the cited references found in COVERED_PATENT_REFERENCES or COVERED_OTHER_REFERENCES, another ranking criteria would be to count the total number of cited references (regardless of the number of patents) contained within all the patents held by an assignee. This would allow an assignee having relatively fewer patents with common cited references but having patents that have multiple common cited references per patent to be better reflected in a ranking. Those skilled in the art will see further variations that take into account multiple references "linking" patents together, forward references and backward references in addition to shared references, references to common non-patent related information (both cited in the patent and later associated with the patent database), etc.

At step 508 the number of patents for each assignee is determined and the assignees are ranked according to the number of patents that have at least one common cited reference from those in the source patent portfolio in step 510. An example SQL statement that can achieve this result using the tables of US patent data shown previously and the intermediate results explained above:
SELECT COUNT(patn) AS pcount, assignee_name
FROM Patents
WHERE patn IN SELECT patn FROM SHARED_REFERENCE_PATENTS
GROUP BY assignee_name
ORDER BY pcount Such an SQL statement would return results in the example format of Table 3 below:

TABLE 3

| assignee_name | pcount |
|---|---|
| XYZ | 29 |
| LMN | 21 |
| ABC | 13 |
| PQR | 13 |
| . | . |
| . | . |
| . | . |

Another way of ranking the distinct assignees determined in step 506 is to provide a weighted view of the patents having a common cited reference with respect to an assignee's (i.e., company's, competitor's) total portfolio. In other words, those assignees who have a large percentage of their total patents having cited references in common with the source patent portfolio will tend to be ranked higher even if they have relatively fewer patents than other assignees who have more numerous patents with common cited references.

This can be easily done by finding the number of total patents for each assignee (in all classes) and dividing this number into the number found having common cited references. This gives a ratio of the total patents to the patents in the covered classes for each assignee.

As an example, the total number of patents for each assignee can be determined by the following SQL statement:
SELECT COUNT(patn) AS pcount, assignee_name
FROM Patents WHERE assignee_name IN
  (SELECT assignee_name
  FROM Patents
  WHERE patn IN
    (SELECT patn
    FROM SHARED_REFERENCE_PATENTS))
GROUP BY assignee_name
ORDER BY pcount Given this information, the calculations can readily be made to determine the ratio above indicating the amount invested each assignee over the common cited references and the results tabulated into Table 4 below:

TABLE 4

| assignee_name | Ratio |
| --- | --- |
| ABC | 1.0 |
| LMN | .88 |
| XYZ | .10 |
| PQR | .10 |
| . | . |
| . | . |
| . | . |

Reviewing the results of Table 4 in comparison with Table 3, we note that while assignee ABC had significantly fewer patents than assignee XYZ, all of those patent had at least one cited reference in common with one of the patents in the source patent portfolio, suggesting a close alignment with the technology covered by the source patent portfolio. XYZ, on the other hand, while having many patents with common cited references may not be as aligned with the technology found in the source patent portfolio.

Finally, at step 512, the results of the previous steps processing that created the ranked list of assignees related by the classes covered by the source patent portfolio is presented to a user. In the environment of the patent data service 204, this is done by returning the results of the SQL statements done on the relational patent data base 212 by the data base server 210 to the web server 206. The results are formatted for the client by the web server 206 and sent to a client browser in response to an initial request.

Figure 6:
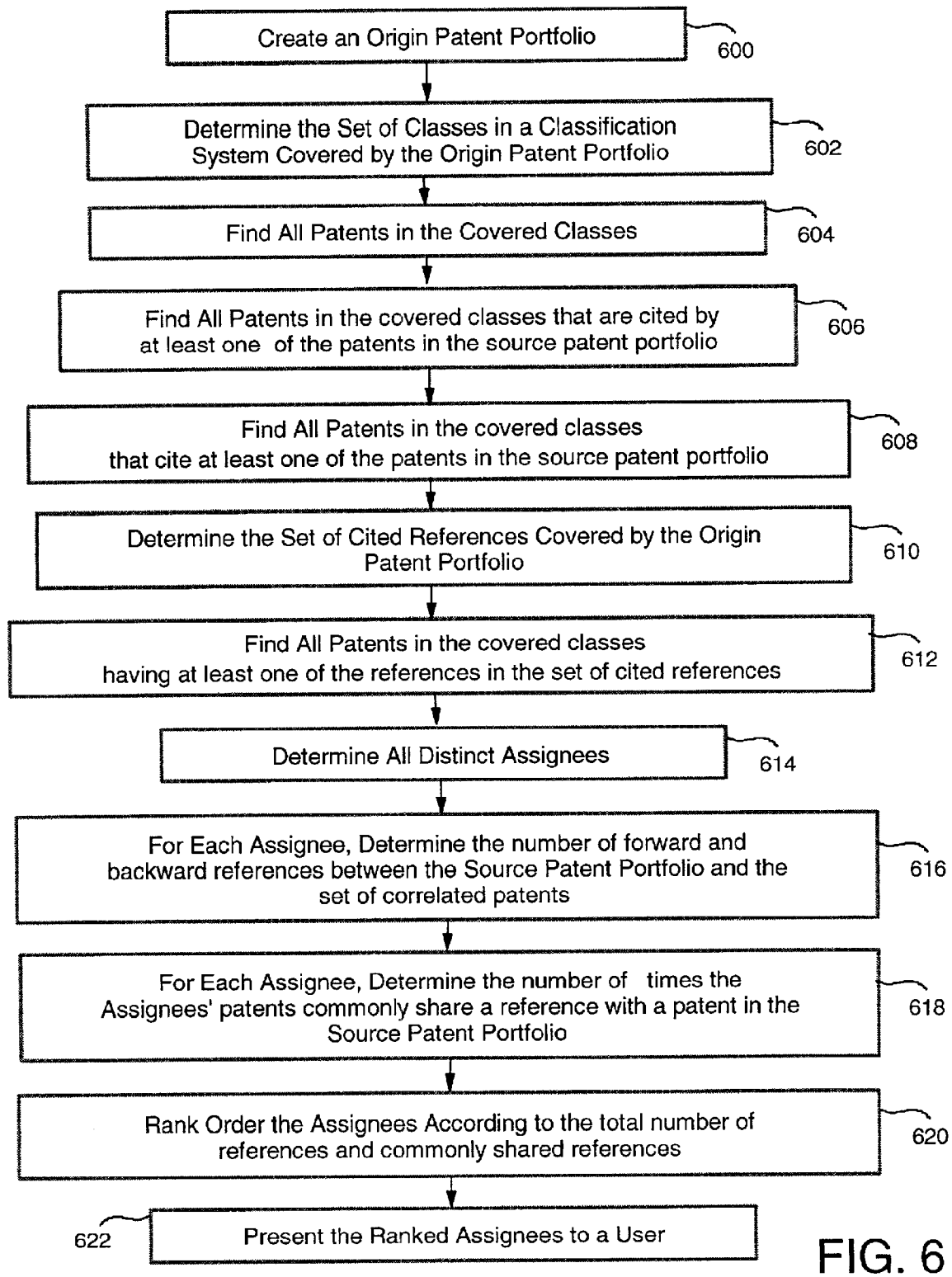
FIG. 6 is a flow chart showing processing steps taken to create and present a list of assignees associated to a source patent portfolio that takes into account the classes covered by the source patent portfolio, the references cited in the patents of the source patent portfolio, the patents with the classes that cite the patents of the source patent portfolio, and patents of the source patent portfolio that have common references with other patents in the set of classes. These assignees are also organized according to a ranking criteria

Referring now to FIG. 6, a flow chart showing processing steps taken to create and present a list of assignees associated to a source patent portfolio that takes into account the classes covered by the source patent portfolio, the references cited in the patents of the source patent portfolio, the patents with the classes that cite the patents of the source patent portfolio, and patents of the source patent portfolio that have common references with other patents in the set of classes. As before, the results of such an analysis can give insight into what other assignees are heavily involved in the same technology areas as that covered by the source patent portfolio.

Initially, at step 600 a source patent portfolio is created or identified. The various ways a patent portfolio can be created was explained in more detail above and will be composed of a set of patent numbers and referred to as PORTFOLIO.

Once the desired source patent portfolio PORTFOLIO is created, the set of classes, COVERED_CLASSES, that are covered by the source patent portfolio is determined at step 602. Again using the example of US patent data organized into relational tables indicated previously, one way to achieve this is shown with the following SQL statement will would return the appropriate set of US classes:
SELECT DISTINCT US_class
FROM Patents
WHERE patn IN SELECT patn FROM PORTFOLIO Now, a set of patents representing all the patents in the covered classes occurs at step 604. This operates as an intermediary set for further processing. One way to achieve this using patent data organized in relational tables as presented previously requires issuing the following SQL statement to create a set of patents, COVERED_PATENTS:
SELECT DISTINCT patn
FROM Patents
WHERE US_class IN SELECT US_class FROM COVERED_CLASSES At step 606, the references cited in the patents that are in source patent portfolio is made so that all the patents in the covered classes that are cited can be determined and made part of a set of correlated patents, CORRELATED_PATENTS. The set of correlated patents will contain patents of interest, namely those having forward references, backward references, and shared references between the source patent portfolio and the patents in the covered classes. The greater number of these "linkages" on an assignee basis will tend to indicate similarity between patents owned by an assignee and the source patent portfolio.

A "backward" reference is one where a particular reference shows up on a patent in the source patent portfolio (or other relevant group of patents) and is backwards in time (i.e., the reference typically predates the patent citing it). A "forward" reference are references to a patent in a source patent portfolio (or other relevant group of patents) and an is forward in time (i.e., the patent that has the reference is later than the patent cited). A "shared" reference is the same reference showing up both in a patent of the source patent portfolio and in a patent contained in the set of covered classes or other relevant group of patents (e.g., all patents, an industry group of patents, etc.).

Initially, the set of correlated patents contains patent correlated by being in the same covered classes as the source patent portfolio and also being cited by at least one of the patents in the source patent portfolio. These are the "backward" references from the patents in the source patent portfolio to the patents in the covered classes. One way this can be done is shown in the following SQL statements. First, a set of unique patent references, UPR, is determined for the source patent portfolio:
SELECT DISTINCT pat_reference
FROM Pref
WHERE patn IN SELECT patn FROM PORTFOLIO Note that only patent references are sought since, for this example, the source patent portfolio and patents in the covered classes are composed of only patents and not other kinds of documents. Then, those patents in the covered classes that are actually cited by one of the patents in the source patent portfolio is given by:
SELECT DISTINCT patn
FROM COVERED_PATENTS
WHERE patn IN SELECT pat_reference FROM UPR Additionally, at step 608, the patents in the covered classes that cite any of the patents in the source patent portfolio are determined. These are the "forward" references from the patents in the covered classes to the patents in the source patent portfolio. This can be done using the following SQL statement:
SELECT DISTINCT pat_reference
FROM Pref
WHERE patn IN
  (SELECT patn
  FROM COVERED_PATENTS)
AND pat_reference IN
  (SELECT patn
  FROM PORTFOLIO)

These patents are also added to the set of correlated patents. Now, the set of correlated patents contains patents with forward references (i.e., those from the patents in the covered classes to patents in the source patent portfolio) and backwards references (i.e., those from patents in the source patent portfolio to patents in the covered classes).

Next, we add to the set of correlated patents those patents in the covered classes that have common or shared references with those patents in the source patent portfolio. As a preliminary matter, the set of covered patent references, COVERED_PATENT_REFERENCES, and the set of covered other references, COVERED_OTHER REFERENCES, from the source patent portfolio is ascertained at step 610. Note that these references are all references (pat_references+other_references) that are cited in the patents of the source patent portfolio and the patents in the covered classes and are not restricted to just the patent references. As before, an SQL statement that can perform this operation for patent references is given by:
SELECT DISTINCT pat_reference
FROM Pref
WHERE patn IN SELECT patn FROM PORTFOLIO
And for other references, the SQL statement is:
SELECT DISTINCT other_reference
FROM Oref
WHERE patn IN SELECT patn FROM PORTFOLIO Next, in step 612, the patents in the covered class that share or have a common reference with the patents in the source patent portfolio is determined. Again, this can be done using an SQL statement in the example environment, with the results being added to the set of correlated patents. The following SQL for patent references:
SELECT DISTINCT patn
FROM Pref
WHERE pat_reference IN
  (SELECT pat_reference
  FROM COVERED_PATENT_REFERENCES)
AND patn IN
  (SELECT patn
  FROM COVERED_PATENTS)
And the following SQL statement for other references:
SELECT DISTINCT patn
FROM Oref
WHERE other_reference IN
  (SELECT other_reference
  FROM COVERED_OTHER_REFERENCES)
AND patn IN
  (SELECT patn
  FROM COVERED_PATENTS)

These patents having shared references are added to the set of correlated patents. The set of correlated patents now contains patents from the covered classes having at least one reference of either "backwards," "forward," or "shared" references.

Using this intermediate set of correlated patents, all the distinct assignees are determined at step 614. At step 616, the number of forward and backwards references between the patents in the source patent portfolio and the patents in the covered classes will be determined for each assignee. At step 618, the number of times a reference is shared between patents in the source patent portfolio with the patents in the covered classes will be determined on an assignee basis.

Finally, at step 620, each distinct assignee will eventually be organized according to a ranking criteria that will help provide meaning into the relationship of the assignee with respect to the source patent portfolio. One way this can be done is to simply tabulate the total number of references (backwards, forwards, and shared) between the patents in the source patent portfolio and the patents in the covered classes.

Below are a set of SQL statements in the example environement that organize and rank the assignees appearing in the set of correlated patents. By adding the results for each particular count value together, and then re-ranking or reordering the assignees based total references, a ranked ordering of assignees having very similar technology to the source patent portfolio results.

For "backwards" references:
SELECT COUNT(pat_reference) AS backward_ref_count, assignee_name
FROM Pref
WHERE patn IN
  (SELECT patn
  FROM COVERED_PATENTS)
AND patn IN
  (SELECT pat_references
  FROM UPR)
GROUP BY assignee name
ORDER BY backward_ref_count This could give results according to Table 5 below:

TABLE 5

| assignee_name | backward_ref_count |
|---|---|
| XYZ | 35 |
| LMN | 27 |
| ABC | 17 |
| PQR | 9 |
| . | . |
| . | . |
| . | . |

For "forward" references:
SELECT COUNT(pat_reference) AS forward_ref_count, assignee_name
FROM Pref
WHERE patn IN
  (SELECT patn
  FROM PORTFOLIO)
AND patn IN
  (SELECT pat_references
  FROM COVERED_UPR)
GROUP BY assignee_name
ORDER BY forward_ref_count This could give results according to Table 6 below:

TABLE 6

| assignee_name | forward_ref_count |
|---|---|
| LMN | 17 |
| XYZ | 9 |
| ABC | 9 |
| PQR | 7 |
| . | . |
| . | . |
| . | . |

For "shared" references, joining the following two statements (one for patent references and the other for other references):
SELECT COUNT(pat_reference) AS shared_ref_count, assignee_name
FROM Patents
WHERE patn IN
  (SELECT patn
  FROM COVERED_PATENTS)

AND pat_reference IN
(SELECT pat_reference
FROM COVERED_PATENT_REFERENCES)
GROUP BY assignee_name
ORDER BY shared_ref_count
SELECT COUNT(other_reference) AS shared_ref_count,
assignee_name
FROM Patents
WHERE patn IN
(SELECT patn
FROM COVERED_PATENTS)
AND other_reference IN
(SELECT other_reference
FROM COVERED_OTHER_REFERENCES)
GROUP BY assignee_name
ORDER BY shared_ref_count This could give results according to Table 7 below:

TABLE 7

| assignee_name | shared_ref_count |
|---|---|
| ABC | 11 |
| LMN | 7 |
| XYZ | 3 |
| PQR | 1 |
| . | . |
| . | . |
| . | . |

Combining the individual results (or using an appropriate SQL statement or statements) would give the total ranked results as shown below in Table 8:

TABLE 8

| assignee_name | backward_ ref_count | forward_ ref_count | shared_ ref_count | Total |
|---|---|---|---|---|
| LMN | 27 | 17 | 7 | 51 |
| XYZ | 35 | 9 | 3 | 47 |
| ABC | 17 | 9 | 11 | 37 |
| PQR | 9 | 7 | 1 | 17 |
| . | . | . | . | . |
| . | . | . | . | . |
| . | . | . | . | . |

Looking only at the total to report back, Table 9 below would indicate that assignee LMN would have the most related technology based on the total number of references:

TABLE 9

| assignee_name | Total (Raw Reference Counts) |
|---|---|
| LMN | 51 |
| XYZ | 47 |
| ABC | 37 |
| PQR | 17 |
| . | . |
| . | . |
| . | . |

By weighting the shared references value by a factor of 5×, a different organization of assignees will result. This would be useful in the case where sharing references more highly indicates that the technology covered by the two sharing patents is more similar. This is given by Tables 10 and 11, respectively, shown below.

TABLE 10

| assignee_name | backward_ ref_count | forward_ ref_count | 5× Weighting shared_ref_count | Total |
|---|---|---|---|---|
| ABC | 17 | 9 | 55 | 81 |
| LMN | 27 | 17 | 35 | 79 |
| XYZ | 35 | 9 | 15 | 59 |
| PQR | 9 | 7 | 5 | 21 |
| . | . | . | . | . |
| . | . | . | . | . |
| . | . | . | . | . |

Looking only at the total to report back, Table 9 below would indicate that assignee LMN would have the most related technology based on the total number of references:

TABLE 11

| assignee_name | Total (Weighted Shared Count) |
|---|---|
| ABC | 81 |
| LMN | 79 |
| XYZ | 59 |
| PQR | 21 |
| . | . |
| . | . |
| . | . |

Finally, at step 622, the results of the previous steps processing' that created the ranked list of assignees related by the classes covered by the source patent portfolio is presented to a user. In the environment of the patent data service 204, this is done by returning the results of the SQL statements done on the relational patent data base 212 by the data base server 210 to the web server 206. The results are formatted for the client by the web server 206 and sent to a client browser in response to an initial request.

Those skilled in the art will see many variations that fit within the ambit of managing and weighting the different kinds of references. For example, one form of reference may be more heavily weighted in some fashion as shown above. Another variation could involve other SQL code to determine multiple references per patent and give additional weighting to those circumstances.

Figure 7:
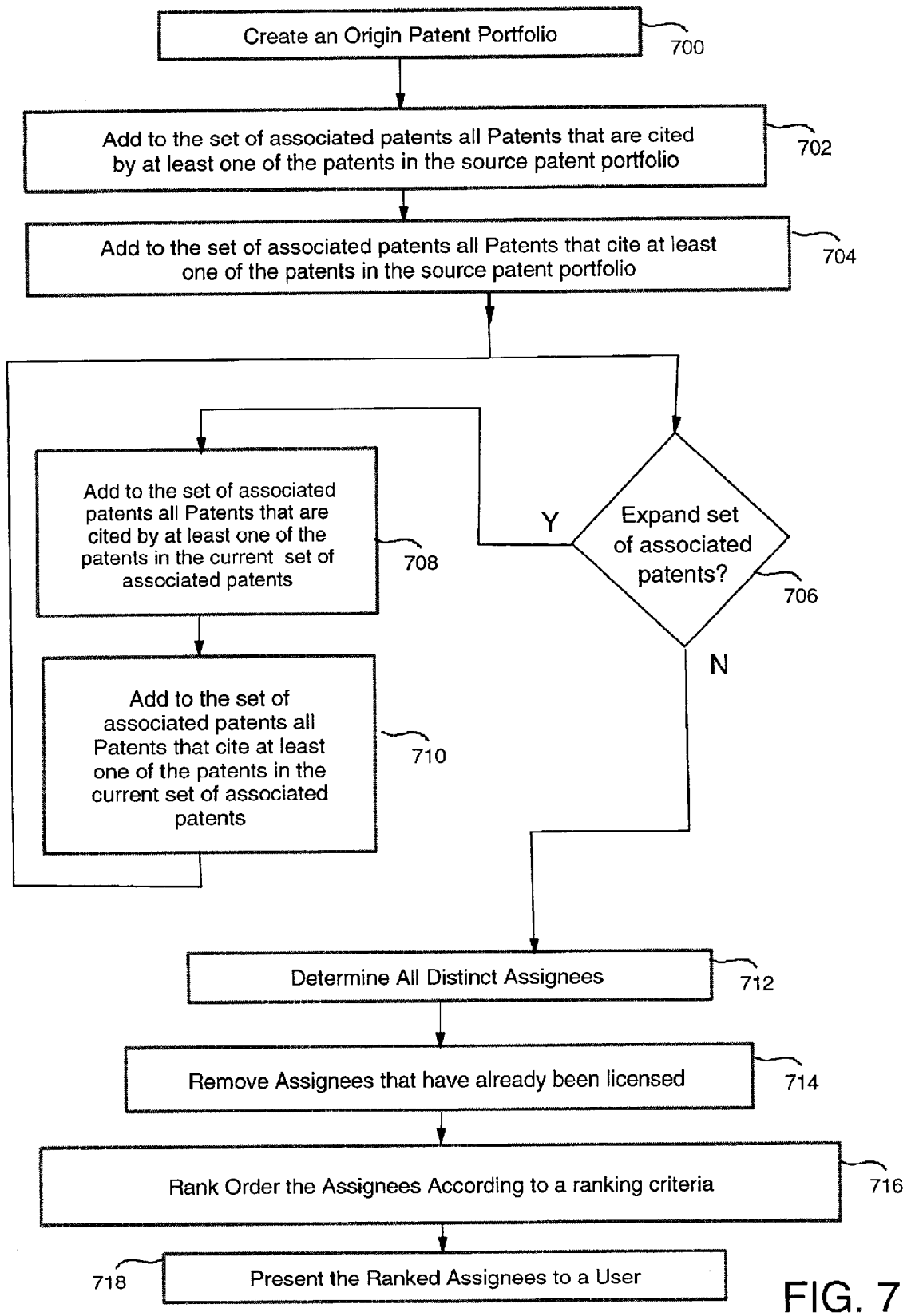
FIG. 7 is a flow chart showing processing steps taken to create and present a list of assignees that would be likely candidates for licensing a source patent portfolio and are organized according to a ranking criteria.

Referring now to FIG. 7, a flow chart showing processing steps taken to create and present a list of assignees that are likely candidates to license a source patent portfolio is shown.

Initially, at step 700 a source patent portfolio is created or identified. The various ways a patent portfolio can be created was explained in more detail above and will be composed of a set of patent numbers and referred to as PORTFOLIO.

At step 702, the patent references cited in the patents that are in the source patent portfolio are added to a set of associated patents, ASSOCIATED_PATENTS. The set of associated patents will eventually contain patents indicating a technology relationship to the source patent portfolio and may include those having forward references, backward references, and shared references with respect to the source patent portfolio. The greater number of these "linkages" on an assignee basis will tend to indicate similarity between patents owned by an assignee and the source patent portfolio, and, hence, a likelihood that a particular assignee would be a candidate for licensing.

A "backward" reference is one where a particular reference shows up on a patent in the source patent portfolio (or other relevant group of patents) and is backwards in time (i.e., the reference typically predates the patent citing it). A "forward" reference is a reference to a patent in a source patent portfolio (or other relevant group of patents) and an is forward in time (i.e., the patent that has the reference is later than the patent cited). A "shared" reference is the same reference showing up both in a patent of the source patent portfolio and in another patent. This other patent may also be constrained to be part of another group, such as those in a specified set of classes (see above) or from the body of all patents.

Initially, the set of associated patents contains those patents that are cited by a patent in the source patent portfolio. One way this can be done is shown in the following SQL statement:
SELECT DISTINCT pat_reference
FROM Pref
WHERE patn IN
  (SELECT patn
  FROM PORTFOLIO)

Additionally, at step 704, patents that cite any of the patents in the source patent portfolio are determined. These are the "forward" references to the patents in the source patent portfolio. This can be done using the following SQL statement:
SELECT DISTINCT patn
FROM Pref
WHERE pat_reference IN
  (SELECT patn
  FROM PORTFOLIO)

These patents are also added to the set of associated patents. Now, the set of associate patents contains patents with forward references (i.e., those to patents in the source patent portfolio) and backwards references (i.e., those from patents in the source patent portfolio).

Additional patents that are directly related to the source patent portfolio could also be added to the set of associated patents could be expanded at this point in a number of ways. For example, patents with shared references with the source patent portfolio could be added.

At step 706, a decision point is made as to whether to expand upon the set of associated patents should be undertaken. Expansion is taken to widen out the number of patents contained in the set of associated patents by looking at patents related to current set of associated patents. This is done by looking at the associated patents and treating them the same as the source patent portfolio to find even more related patents. In other words, the current set of associated patents can be analyzed for backward, forward, and shared references to still other patents. These other patents are then added to the set of associated patents so that set of associated patents expands in size and breadth. This can be done over a number of iterations or until a specific number of patents are in the set of associated patents or any other criteria.

If the decision is made to expand the set of associated patents at step 706, one embodiment will add to the set of associated patents, at step 708, all patents that are cited by any one of the patents currently in the set of associated patents (i.e., backward references). An SQL statement that can accomplish this is given as follows:
SELECT DISTINCT pat_reference
FROM Pref
WHERE patn IN
  (SELECT patn
  FROM ASSOCIATED_PATENTS))

At step 710, we add all patents that cite any one of the patents currently in the set of associated patents to the set of associated patents (i.e., forward references). This can be accomplished with the following SQL statement: patent portfolio. This can be done, for example, using the following SQL statement:
SELECT DISTINCT patn
FROM Pref
WHERE pat_reference IN
  (SELECT patn
  FROM ASSOCIATED_PATENTS)

Note that it is desirable in some instances for the backward reference patent should not be added into the set of associated patents until the forward reference patents are gathered so as expand the set of associated patents equally. Note also that patents with shared references with the current set of associated patents may also be ascertained and added to the set of associated patents. Further, other related patents may added as will be apparent to one skilled in the art.

The recursive querying capability of modern relational databases, such as DB2, provide an easy mechanism to expand out the set of associated patents to many levels. How many levels (or iterations through steps 706–710) will determine the size of the set of associated patents from which assignees will be derived.

Next, at step 712, the assignees contained in the set of associated patents is determined as RAW_ASSIGNEES. An example SQL statement to achieve this would be:
SELECT DISTINCT assignee_name
FROM Patents
WHERE patn IN
  (SELECT patn
  FROM ASSOCIATED_PATENTS)

The assignees who have already been licensed are removed from the list of "raw" assignees at step 714 and are seen as potential licensees. One way this can be done is through the SQL statement below that presumes storing licensing information on a per patent basis and builds upon the statement above:
SELECT DISTINCT assignee_name
FROM Patents
WHERE patn IN
  (SELECT patn
  FROM ASSOCIATED_PATENTS)
AND licensee_flag!='Y'

Those skilled in the art will recognize that a list of licensed assignees (either by name or PTO number) could be compiled and then subtracted from the list of "raw" assignees.

At step 716, the potential licensees may be ranked according to numerous criteria as has been explained previously. They can be ranked by the assignees with the most patents in the set of associated patents or source patent portfolio, the largest number of "references" to patents in the associated patents or source patent portfolio (e.g., backward, forward, and shared), a ratio based on either number references or number patents divided by the total number of patents owned by an assignee, any of the above with an extra weighting given to a patent with multiple references or extra weighting given to a type of reference, etc.

Finally, at step 718, the results of the previous steps processing that created the ranked list of assignees that are potential licensees of a source patent portfolio is presented to a user. In the environment of the patent data service 204, this is done by returning the results of the SQL statements done on the relational patent data base 212 by the data base server 210 to the web server 206. The results are formatted for the client by the web server 206 and sent to a client browser in response to an initial request.

Note that elements of the various scenarios shown in FIGS. 4–7 can be combined as will be apparent by those skilled in the art. For example, the principle introduced in connection with FIG. 7, steps 706–710, that broadens out the number of patents to successive levels can be applied to the scenarios shown in FIGS. 4–6.

By way of example and not limitation, the expansion principle can be applied is to the set of cited references and patents having at least one of the references in FIG. 5, steps 502–504, by taking the SHARED_REFERENCE_PATENTS and working with those patents as a starting point for determining the set of cited references to expand out to another level. The effect of this expansion is to increase the number of SHARED_REFERENCE_PATENTS yields higher quality end results in many instances since certain assignees are better represented. The same expansion could apply to the scenario shown in FIG. 6 where the set of correlated patents is likewise expanded to successive levels.

While the preferred embodiment of the present invention has been described in detail, it will be understood that modification and adaptations to the embodiment(s) shown may occur to one of skill in the art without departing from the scope of the present invention as set forth in the following claims. Thus, the scope of this invention is to be construed according to the appended claims and not just to the specifics disclosed in the exemplary embodiment or embodiments.

References in the claims to an element in the singular is not intended to mean "one and only" unless explicitly so stated, but rather "one or more." All structural and function equivalents to the elements of the above-described exemplary embodiment that are currently known or later come to be known to those of ordinary skill in the art are expressly incorporated herein by reference and are intended to be encompassed by the present claims. No element, component, or method step in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for" or "step for."

What is claimed is:

1. A method for determining potential licensees for a source patent portfolio comprising one or more patents, the method comprising:

devising a set of associated patents wherein each patent in the set of associated patents i) cites as a reference a patent in the source patent portfolio or ii) is cited as a reference by a patent in the source patent portfolio;

processing all of the patents in the set of associated patents to establish a set of assignees contained in the set of associated patents;

establishing a set of remaining assignees by removing from the set of assignees all assignees that are currently licensed; and organizing the set of remaining assignees according to a ranking criteria that causes a higher ranking to be given to any assignee when the following ratio is greater for that assignee than for other assignees, wherein the ranking criteria gives more weight to assignees both i) having patents that have a reference to a patent in the source patent portfolio and ii) having patents that are cited as a reference by a patent in the source patent portfolio;

assignee's patents in the set of associated patents: all patents held by assignee.

2. A method as recited in claim 1 further comprising: adding, to the set of associated patents, patents that cite as a reference patents in the original set of associated patents or patents that are cited as a reference by a patent in the original set of associated patents.

3. A method as recited in claim 1 further comprising:

determining a set of cited references contained in the patents of the source patent portfolio;

adding, to the set of associated patents, patents that contain at least one of the references found in the net of cited references.

4. A method as recited in claim 1 wherein the source patent portfolio is the set of all patents assigned to a particular assignee.

5. A method as recited in claim 1 further comprising;

presenting the organized assignees in an HTML document that can be read by an Internet browser.

6. A method as recited in claim 1 wherein the ranking criteria gives more weight to assignees having patents that have commonly cited references with patents in the source patent portfolio.

7. A computer program product comprising:

a computer usable medium;

computer readable instructions embodied on said computer useable medium for determining potential licensees for a source patent portfolio comprising one or more patents, the instructions directing a computer to perform the steps of:

devising a set of associated patents wherein each patent in the set of associated patents 1) cites as a reference a patent in the source patent portfolio or ii) is cited as a reference by a patent in the source patent portfolio;

processing all of the patents in the set of associated patents to establish a set of assignees contained in the set of associated patents;

establishing a set of remaining assignees by removing from the set of assignees all assignees that are currently licensed; and organizing the set of remaining assignees according to a ranking criteria that causes a higher ranking to be given to any assignee when the following ratio is greater for that assignee than for other assignees, and wherein the ranking criteria gives more weight assignees both i) having patents that have a reference to a patent in the source patent portfolio and ii) having patents that are cited as a reference by a patent in the source patent portfolio:

assignee's patents in the set of associated patents: all patents held by assignee.

8. A computer program product as recited in claim 7 further comprising the instructions directing a computer to perform the steps of:

adding, to the set of associated patents, patents that cite as a reference patents in the original set of associated patents or patents that are cited as a reference by a patent in the original set of associated patents.

9. A computer program product as recited in claim 7 further comprising the instructions directing a computer to perform the steps of:

determining a set of cited references contained in the patents of the source patent portfolio;

adding, to the set of associated patents patent that contain at least one of the references found in the set of cited references.

10. A computer program product as recited in claim 7 wherein the source patent portfolio is the set of all patent assigned to a particular assignee.

11. A computer program product as recited in claim 7 further comprising the instructions directing a computer to perform the steps of:

presenting the organized assignees in an HTML document that can be read by an Internet browser.

12. A computer program product as recited in claim 7 wherein the ranking criteria gives more weight to assignees having patents that have commonly cited references with patents in the source patent portfolio.

13. A system for determining potential licensees for a source patent portfolio comprising one or more patents where each patent has one or more references cited thereto, the system comprising:

means for devising a set of associated patents wherein each patent in the set of associated patents i) cites as a reference a patent in the source patent portfolio or ii) is cited as reference by a patent in the source patent portfolio;

means for processing all of the patents in the set of associated patents to establish a set of assignees contained in the set of associated patents;

means for establishing a set of remaining assignees by removing from the set of assignees all assignees that are currently licensed; and means for organizing the set of remaining assignees according to a ranking criteria that causes a higher ranking to be given to any assignee when the following ratio is greater for that assignee than for other assignees, wherein the ranking criteria gives more weight to assignees both i) having patents that have a reference to a patent in the source patent portfolio and ii) having patents that are cited as a reference by a patent in the source patent portfolio:

assignee's patents in the set of associated patents: all patents held by assignee.

14. A system as recited in claim 13 further comprising:

means for adding, to the set of associated patents, patents that cite as a reference patents in the original set of associated patents or patents that are cited as a reference by a patent in the original set of associated patents.

15. A system as recited in claim 13 further comprising:

means for determining a set of cited references contained in the patents of the source patent portfolio;

means for adding to the set of associated patents, patents that contain at least one of the references found in the set of cited references.

16. A system as recited in claim 13 wherein the source patent portfolio is the set of all patents assigned to a particular assignee.

17. A system as recited in claim 13 further comprising:

means for presenting the organized assignees in an HTML document that can be read by an Internet browser.

18. A system as recited in claim 13 wherein the ranking criteria gives more weight to assignees having patents that have commonly cited references with patents in the source patent portfolio.

* * * * *